(12) United States Patent
Schlipf et al.

(10) Patent No.: US 11,186,356 B2
(45) Date of Patent: Nov. 30, 2021

(54) WING FOR AN AIRCRAFT

(71) Applicant: Airbus Operations GmbH, Hamburg (DE)

(72) Inventors: Bernhard Schlipf, Hamburg (DE); Florian Lorenz, Hamburg (DE); Stefan Bensmann, Hamburg (DE); Dustin Shapi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 47 days.

(21) Appl. No.: 16/664,197

(22) Filed: Oct. 25, 2019

(65) Prior Publication Data

US 2020/0122819 A1 Apr. 23, 2020

Related U.S. Application Data

(63) Continuation of application No. PCT/EP2018/060809, filed on Apr. 26, 2018.

(30) Foreign Application Priority Data

Apr. 28, 2017 (DE) ...................... 10 2017 004 090.7
Oct. 11, 2017 (DE) ...................... 10 2017 123 701.1

(51) Int. Cl.
*B64C 9/24* (2006.01)
*B64C 13/32* (2006.01)

(52) U.S. Cl.
CPC .............. *B64C 9/24* (2013.01); *B64C 13/32* (2013.01)

(58) Field of Classification Search
CPC .. B64C 9/24; B64C 13/32; B64C 9/22; Y02T 50/40; Y02T 50/30
See application file for complete search history.

(56) References Cited

U.S. PATENT DOCUMENTS 2,938,680 A 5/1960 Greene et al.
3,272,458 A 9/1966 Bracka
(Continued)

FOREIGN PATENT DOCUMENTS

CN 110546065 A 12/2019
CN 110573422 A 12/2019
(Continued)

OTHER PUBLICATIONS

German Search Report for Application No. 10 2017 124 793.9 dated Feb. 27, 2018.
(Continued)

*Primary Examiner* — Valentina Xavier
(74) *Attorney, Agent, or Firm* — Jenkins, Wilson, Taylor & Hunt, P.A.

(57) ABSTRACT

A wing for an aircraft includes a main wing, slat, and connection assembly movable connecting the slat and main wing. The connection assembly includes an elongate slat track, a front end of which is mounted to the slat. The rear end and intermediate portion of the slat track are mounted to the main wing by a roller bearing including a guide rail mounted to the main wing and a first roller unit mounted to the rear end of the slat track and engaging the guide rail. The roller bearing includes a second roller unit mounted to the main wing and engaging an engagement surface at the intermediate portion of the slat track. The slat track profile has upper and lower flange portions and a web portion connecting them. The second roller unit is in a recess between upper and lower flange portions and engages the engagement surface at the upper flange portion and/or at the lower flange portion.

15 Claims, 7 Drawing Sheets

(56) References Cited

U.S. PATENT DOCUMENTS

| | | | |
|---|---|---|---|
| 3,940,093 A | | 2/1976 | Cabriere |
| 4,360,176 A | | 11/1982 | Brown |
| 4,471,928 A | | 9/1984 | Cole |
| 5,039,032 A | | 8/1991 | Rudolph |
| 5,544,847 A | * | 8/1996 | Bliesner .................. B64C 9/24 244/214 |
| 8,292,235 B2 | * | 10/2012 | Wollaston ................ B64C 9/24 244/213 |
| 8,511,619 B2 | | 8/2013 | Mann |
| 9,016,636 B2 | | 4/2015 | Parker |
| 10,053,237 B2 | * | 8/2018 | Huang ............... B64D 45/0005 |
| 2007/0102587 A1 | * | 5/2007 | Jones ..................... B64C 9/22 244/214 |
| 2015/0090843 A1 | | 4/2015 | Guering |
| 2018/0312243 A1 | * | 11/2018 | Vervliet ................... B64C 9/22 |
| 2020/0148331 A1 | | 5/2020 | Bensmann |

FOREIGN PATENT DOCUMENTS

| | | |
|---|---|---|
| EP | 2 316 727 A1 | 5/2011 |
| EP | 3 176 076 A1 | 6/2017 |
| GB | 298 508 A | 10/1928 |
| GB | 404149 | 1/1934 |
| GB | 1 492 177 A | 11/1977 |
| GB | 2 204 538 A | 11/1988 |
| JP | 2011/515277 A | 5/2011 |
| JP | 2012/501895 A | 1/2012 |
| JP | 2020/517521 A | 6/2020 |
| JP | 2020/517524 A | 6/2020 |
| JP | 6840893 B2 | 3/2021 |
| RU | 2497717 C2 | 11/2013 |
| WO | WO 2009/118547 A2 | 10/2009 |
| WO | WO 2010/026410 A2 | 3/2010 |
| WO | WO 2018/197265 A1 | 11/2018 |
| WO | WO 2018/197649 A1 | 11/2018 |

OTHER PUBLICATIONS

Japanese Search Report for Application No. 2020-507746 dated Sep. 4, 2020.
Japanese Search Report for Application No. 2019-558586 dated Sep. 7, 2020.
Japanese Office Action for Application No. 2019-558586 dated Sep. 29, 2020.
Japanese Office Action for Application No. 2020-507746 dated Sep. 29, 2020.
International Search Report and Written Opinion for Application No. PCT/EP2018/059763 dated Jun. 18, 2018.
Russian Search Report for Application No. 2019138316/11(075635) dated Aug. 25, 2020.
Russian Office Action for Application No. 2019138316/11(075635) dated Nov. 3, 2020.
European Office Action for Application No. 18719113 dated Nov. 20, 2020.
European Office Action for Application No. 18721349.1 dated Nov. 27, 2020.
International Search Report and Written Opinion for Application No. PCT/EP2018/060809 dated Jun. 20, 2018.
German Search report for Application No. 10 2017 123 701.1 dated Feb. 27, 2018.
Decision to Grant for Application No. 2019138316/11(075635) dated Feb. 3, 2021.
European Office Action for Application No. 18719113 dated Jul. 12, 2021.

* cited by examiner

US 11,186,356 B2

WING FOR AN AIRCRAFT

CROSS-REFERENCE TO RELATED APPLICATIONS

This patent application is a continuation of and claims priority to International Application No. PCT/EP2018/060809 filed Apr. 26, 2018, which claims priority to German Patent Application No. 10 2017 004 090.7 filed Apr. 28, 2017 and German Patent Application No. 10 2017 123 701.1 filed Oct. 11, 2017, the entire disclosures of which are incorporated by reference herein.

TECHNICAL FIELD

The disclosure herein relates to a wing for an aircraft, comprising a main wing, a slat, and a connection assembly movable connecting the slat to the main wing, such that the slat is movable between a retracted position and at least one extended position. Further aspects of the disclosure herein relate to an aircraft comprising such a wing and to a connection assembly as used in such a wing.

BACKGROUND

The connection assembly comprises an elongate slat track that extends along a track longitudinal axis between a front end and a rear end and has an intermediate portion between the front and rear ends. The front end of the slat track is preferably fixedly mounted to the slat, e.g. by two spherical bearings, both arranged with an offset in a wing profile plane across a wing span direction. The rear end and the intermediate portion of the slat track are movably mounted to the main wing by a roller bearing such that the slat track is movable along the track longitudinal axis, i.e. along a predefined path, preferably a circular path.

The roller bearing comprises a guide rail fixedly mounted to the main wing and a first roller unit mounted to the rear end of the slat track and engaging the guide rail. Preferably, the guide rail is formed, e.g. by a c-shape, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. I.e., the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Further preferably, the first roller unit has a first axis of rotation extending in parallel to a wing span direction, to a leading edge of main wing, or to a leading edge of the slat.

The roller bearing comprises a second roller unit that is fixedly mounted to the main wing and that engages an engagement surface provided at the intermediate portion of the slat track. Preferably, the second roller unit has a second axis of rotation extending in parallel to the wing span direction, to the leading edge of main wing, or to the leading edge of the slat.

Such wings are known in the art, for example from GB 404,149, where the connections assembly comprises a second roller unit composed of two roller elements engaging the slat track on opposite upper and lower surfaces. However, there is a constant need in the art to reduce size, weight and complexity of the connection assembly and, thus, of the entire wing.

SUMMARY

Therefore, an object of the disclosure herein is to provide a possibly simple, lightweight and cost-efficient wing design.

This object is achieved in that the slat track has a profile, i.e. a cross section across the longitudinal axis, comprising an upper flange portion, a lower flange portion and at least one web portion connecting upper and lower flange portions. Such a profile might be e.g. a C-profile, a double-C-profile, an I-profile, an H-profile, or a Π-profile. The second roller unit is arranged in a recess between upper and lower flange portions and engages the engagement surface provided at the upper flange portion and/or at the lower flange portion, preferably either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

According to a preferred embodiment, the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

In particular, it is preferred that the second roller unit comprises a first roller element and a second roller element. The first roller element is arranged in the first recess and the second roller element is arranged in the second recess. First and second roller elements are arranged coaxially, i.e. both rotating about the second axis of rotation, and have the same radius. By the first and second roller element higher loads can be absorbed and a symmetric arrangement or an arrangement with two separate load paths is enabled.

Further, it is preferred that the web portion of the slat track comprises a slot extending from the first side to the second side of the web portion and extending elongated along the track longitudinal axis. Preferably, the slot extends along the track longitudinal axis at least as long as the distance by which the slat is moved between the retracted and a fully extended position. The first roller element and the second roller element are mounted on one common shaft for common rotation. The common shaft proceeds through the slot from the first side to the second side of the web portion. Preferably, opposite ends of the common shaft are supported at the main wing. By using one common shaft to support first and second roller elements bending loads introduced in the main wing structure are minimized.

According to an alternative embodiment, the first roller element is mounted on a first shaft and the second roller element is mounted on a second shaft separate from the first shaft. Preferably, first and second shafts are independently supported at the main wing. By using separate shafts to support first and second roller elements no slot through the slat track is required.

According to a preferred embodiment, the first roller unit comprises a single third roller element, preferably mounted to the slat track by a yoke-shaped rear end of the slat track that holds the third roller element from opposite sides. Using only a single third roller element represents a very simple design.

In an alternative embodiment, the first roller unit comprises a third roller element and a fourth roller element. Third and fourth roller elements are arranged coaxially, i.e. both rotating about the first axis of rotation, and have the same radius. Preferably, the third roller element is arranged at the first side and the fourth roller element is arranged at the second side of the web portion. In such a way, a backup roller element is provided.

According to a preferred embodiment, the slat track comprises a first track part and a second track part that are formed separate from one another. Each of the first and second track parts is formed integrally and extends along the track longitudinal axis from the rear end to the front end. The first and second track parts are mounted to one another, e.g. by bolts, and rest against one another along a contact plane spanned by the track longitudinal axis and a wing thickness direction, which might be a vertical symmetry plane, preferably along the entire longitudinal extension. By the first and second track part two separate load paths are introduced which might be designed as redundant load paths such that when one load path fails the other load path is still capable of carrying the occurring air loads applied via the slat.

In particular, it is preferred that the third roller element is mounted to both the first track part and the second track part. In such a way, in case of failure of one of the first and second track parts the third roller element would still be sufficiently supported by the other one of the first and second track parts, so that this track part would still be guided by the third roller element.

Alternatively, it is preferred that the third roller element is mounted to the first track part and the fourth roller element is mounted to the second track part. In such a way, in case of failure of one of the first and second track portions the other one of the first and second track portions would still be guided by the associated one of the third and fourth rollers.

According to a preferred embodiment, the distance between the upper flange portion and the lower flange portion of the slat track is larger than a diameter of the second roller unit, such that a clearance is provided either between the second roller unit and the engagement surface at the upper flange portion, or between the second roller unit and the engagement surface at the lower flange portion. Specifically, the clearance is smaller, preferably down to a minimum, at gated locations along the slat track where the second roller unit is located when the slat is in the retracted position and/or in a fully extended position and/or in a defined partly extended position, e.g. take-off position. At the same time, the clearance is larger in areas between the gated locations. Such gated locations with minimum clearance simplify control of the slat movement between the retracted and extended positions.

According to a further preferred embodiment, the roller bearing comprises a third roller unit mounted to the main wing and engaging an upper surface of the upper flange portion of the slat track. Preferably, the third roller unit comprises one common roller element engaging both first and second track parts. Further preferably, the third roller element rotates about a third axis of rotation in parallel to the wing span direction. Further preferably, the third roller unit is arranged proximate the leading edge of the main wing and might be arranged inside the main wing, partly outside the main wing or fully outside the main wing with respect to an outer skin profile line of the main wing. By such a third roller unit additional support of the slat against the air loads is obtained.

According to yet a further preferred embodiment, the connection assembly is a first connection assembly. The wing comprises a second connection assembly connecting the slat to the main wing in a position spaces apart from the first connection assembly in a wing span direction. The second connection assembly is formed as the first connection assembly, i.e. has the same features as the first connection assembly. Alternatively, the second connections assembly might also be formed different from the first connection assembly.

A further aspect of the disclosure herein relates to an aircraft comprising a wing according to any of the aforedescribed embodiments. The features and advantages mentioned in connection with the wing also apply for the aircraft.

Yet a further aspect of the disclosure herein relates to a connection assembly for movably connecting a slat to a main wing for an aircraft, as described above in connection with the wing. The connection assembly comprises an elongate slat track that extends along a track longitudinal axis between a front end and a rear end and has an intermediate portion between the front and rear ends. The front end of the slat track is configured to be mounted to the slat. The rear end and the intermediate portion of the slat track are configured to be mounted to the main wing by a roller bearing such that the slat track is movable along the track longitudinal axis. The roller bearing comprises a guide rail configured to be mounted to the main wing, and a first roller unit mounted to the rear end of the slat track and configured for engaging the guide rail. The roller bearing comprises a second roller unit that is configured to be mounted to the main wing and that is configured for engaging an engagement surface provided at the intermediate portion of the slat track. The slat track has a profile comprising an upper flange portion, a lower flange portion and at least one web portion connecting upper and lower flange portions. The second roller unit is configured to be arranged in a recess between upper and lower flange portions and to engage the engagement surface provided at the upper flange portion and/or at the lower flange portion. The features and advantages mentioned in connection with the wing also apply for the connection assembly that can be used in such a wing.

BRIEF DESCRIPTION OF THE DRAWINGS

Hereinafter, preferred embodiments of the disclosure herein are explained in more detail by example drawings, in which.

DETAILED DESCRIPTION

Figure 1:
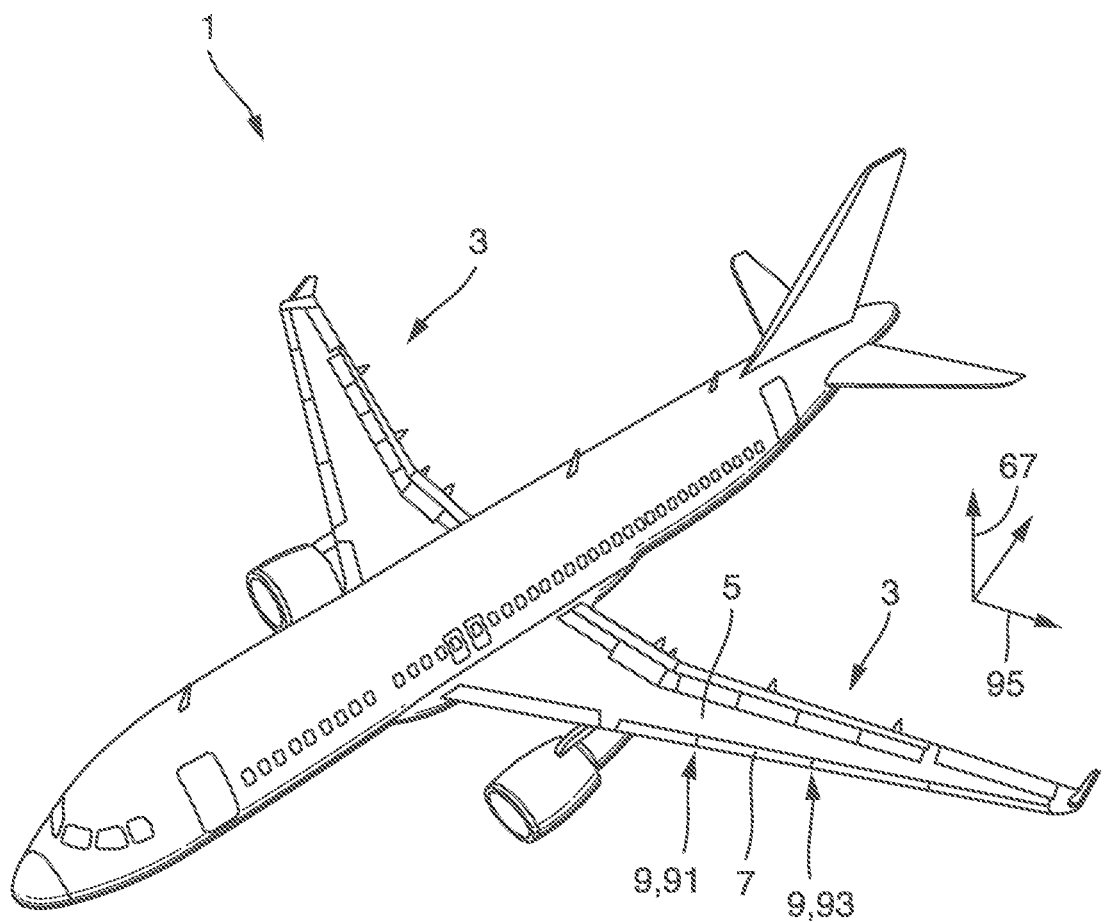
FIG. 1 is a perspective view of an aircraft according to the disclosure herein, including a wing.

In FIG. 1 an aircraft 1 according to an embodiment of the disclosure herein is illustrated. The aircraft 1 comprises a wing 3 that is formed according to an embodiment of the disclosure herein.

Figure 2:
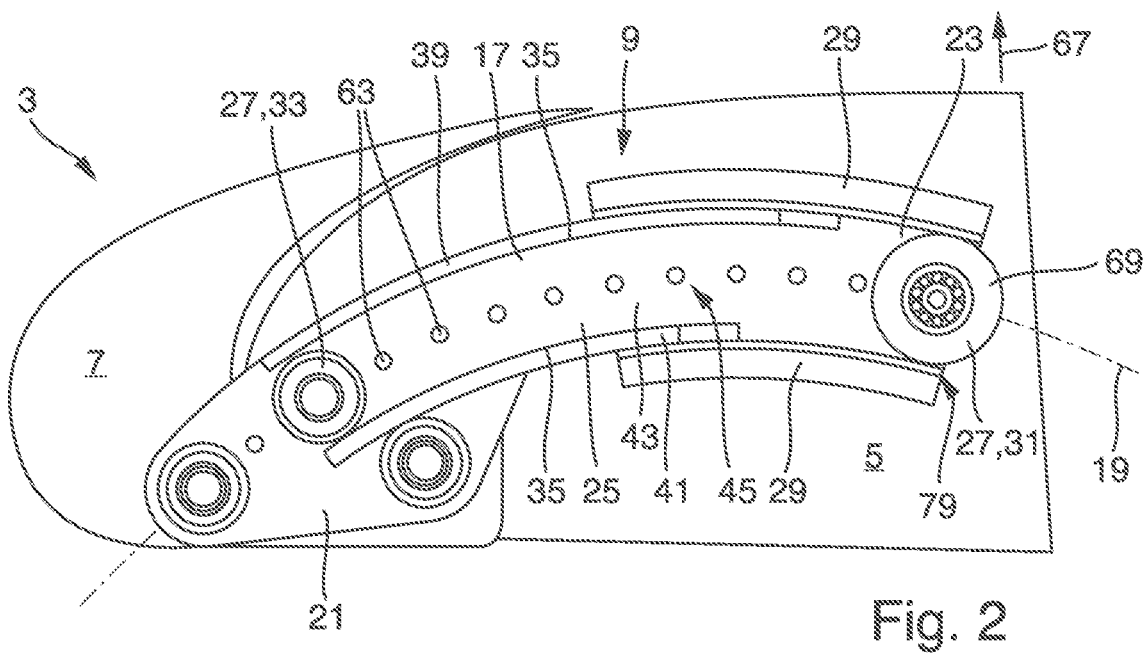
FIG. 2 is a cross sectional view of the wing shown in FIG. 1, including a connection assembly.

FIG. 2 shows the wing 1 from FIG. 1 in more detail. The wing 1 comprises a main wing 5, a slat 7, and a connection assembly 9 movable connecting the slat 7 to the main wing 5, such that the slat 7 is movable between a retracted position 11 and at least one extended position 13, 15.

Figure 3:
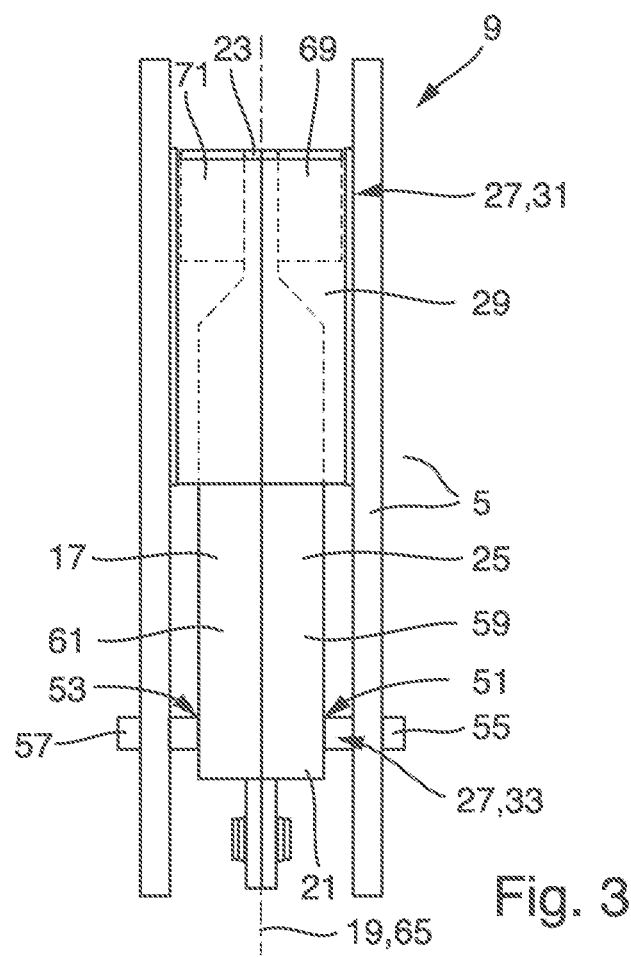
FIG. 3 is a top view of the connection assembly shown in FIG. 2.
Figure 4:
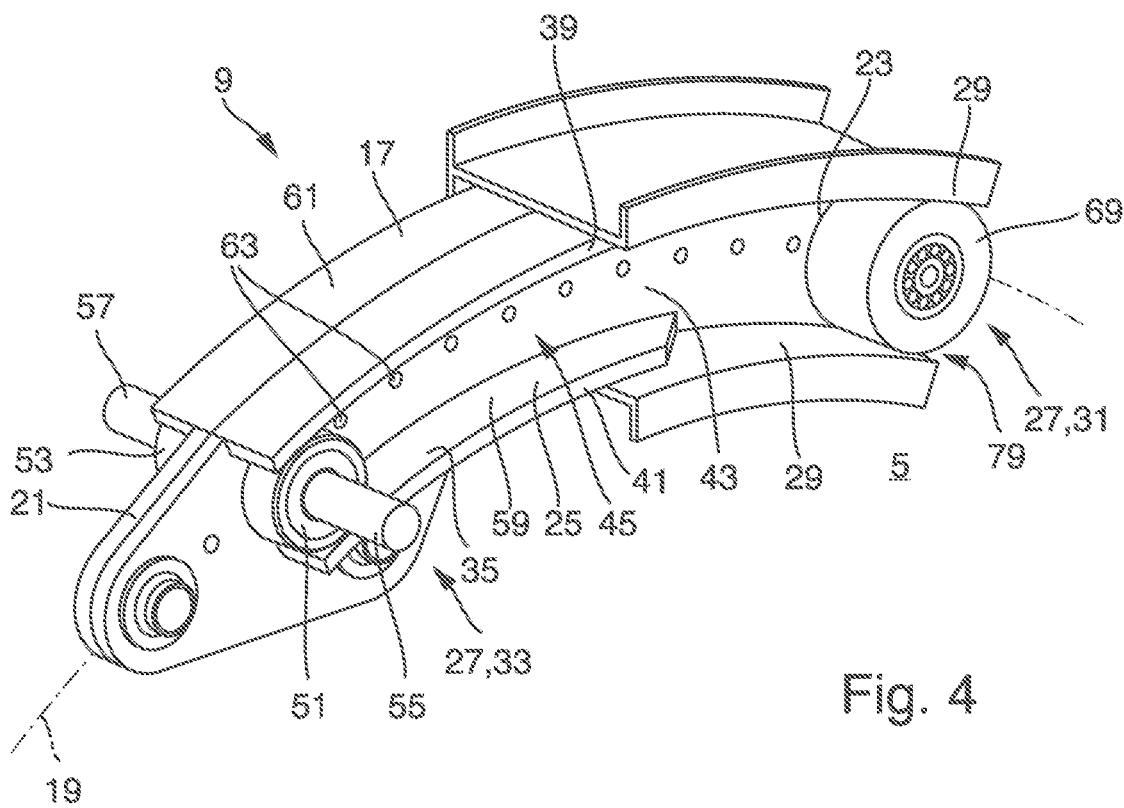
FIG. 4 is a perspective view of the connection assembly shown in FIG. 2.
Figure 5:
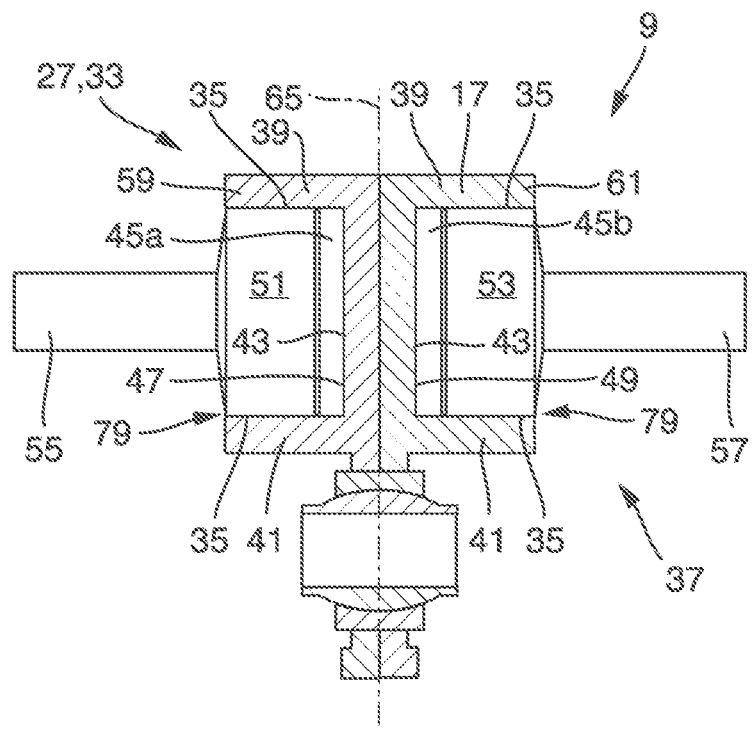
FIG. 5 is a cross sectional view across the track longitudinal axis of the connection assembly shown in FIG. 2.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

Figure 6:
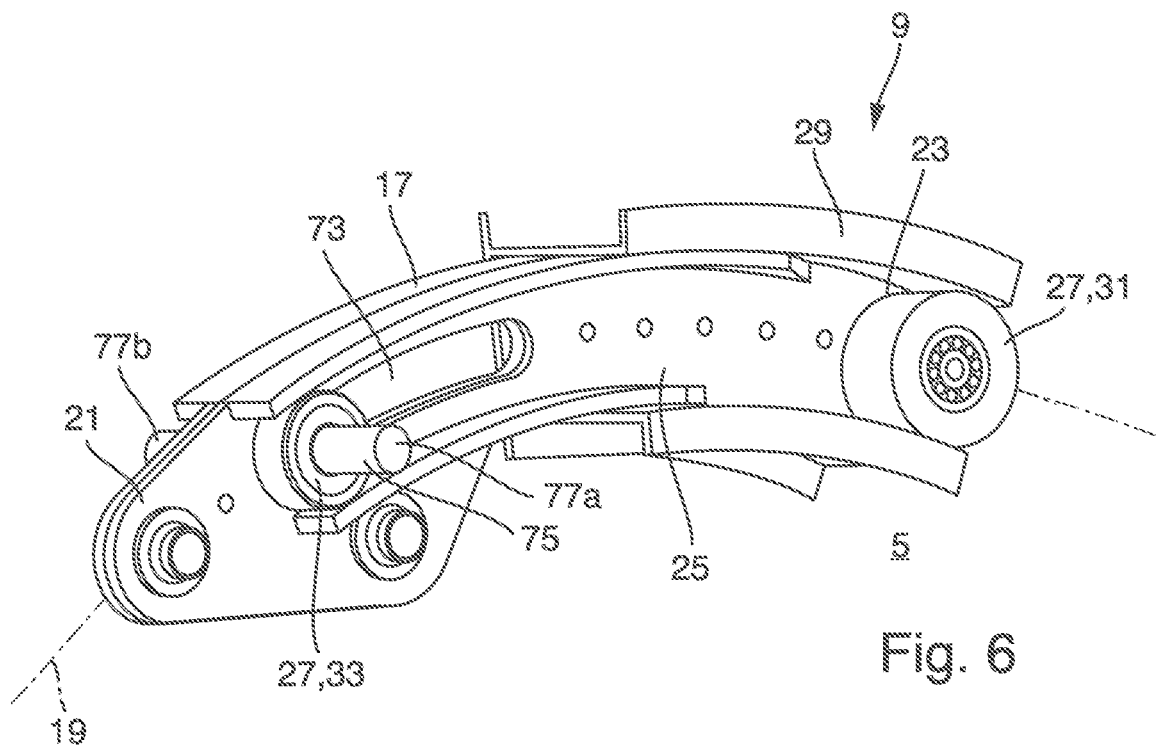
FIG. 6 is a perspective view of a connection assembly according to another embodiment of the disclosure herein.
Figure 7:
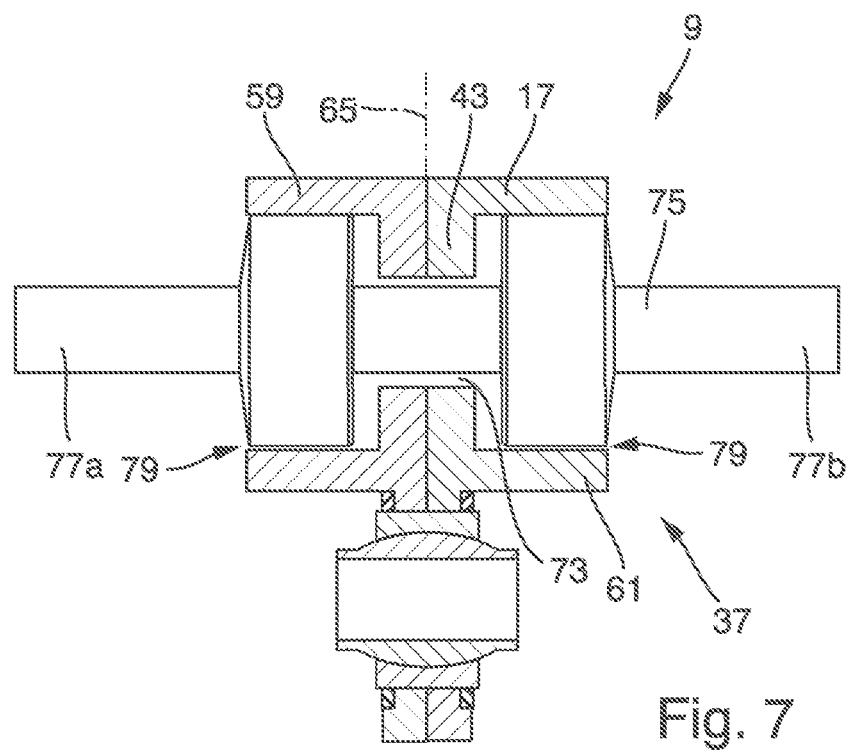
FIG. 7 is a cross sectional view across the track longitudinal axis of the connection assembly shown in FIG. 6.

FIGS. 6 and 7 show an alternative to the separate first and second shafts 55, 57 that are independently supported at the main wing 5. Here, the web portion 43 of the slat track 17 comprises a slot 73 extending from the first side 47 to the second side 49 of the web portion 43 and extending elongated along the track longitudinal axis 19. The first roller element 51 and the second roller element 53 are mounted on one common shaft 75 for common rotation. The common shaft 75 proceeds through the slot 73 from the first side 47 to the second side 49 of the web portion 43. Opposite ends 77a, 77b of the common shaft 75 are supported at the main wing 5.

Figure 8A:
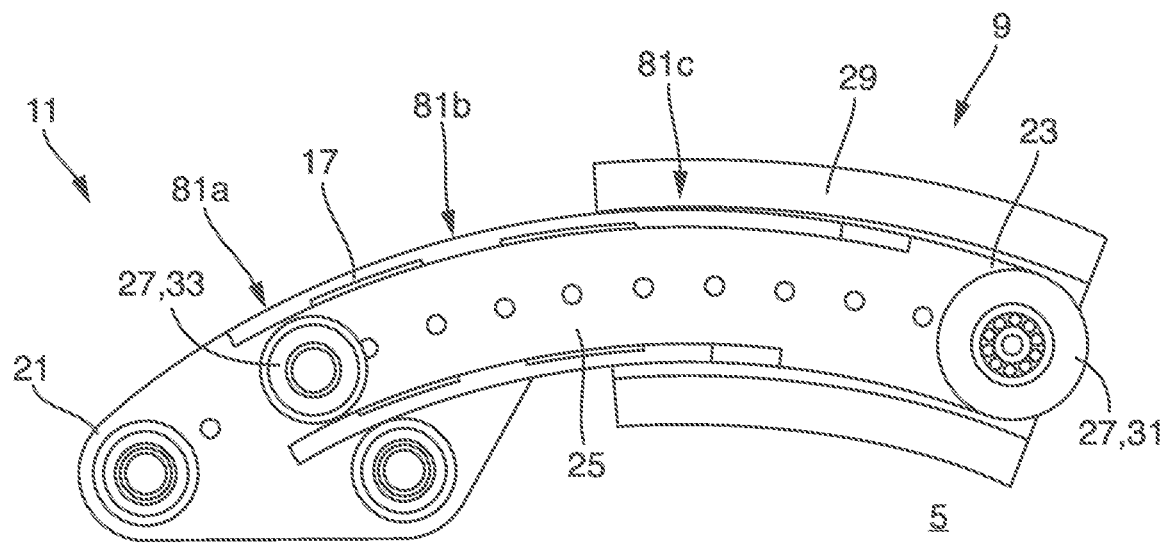
FIGS. 8a, 8b and 8c are three side views of a connection assembly according to a further embodiment of the disclosure herein.
Figure 8B:
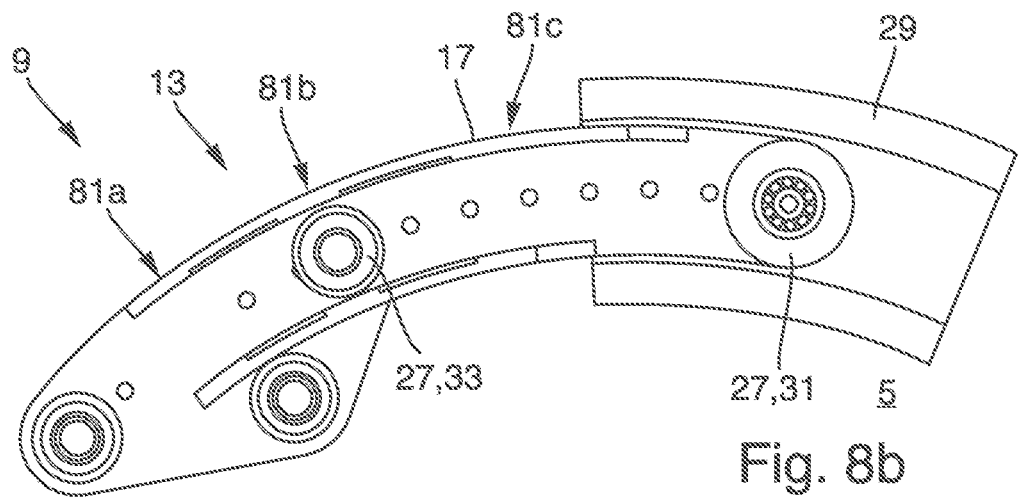
Figure 8C:
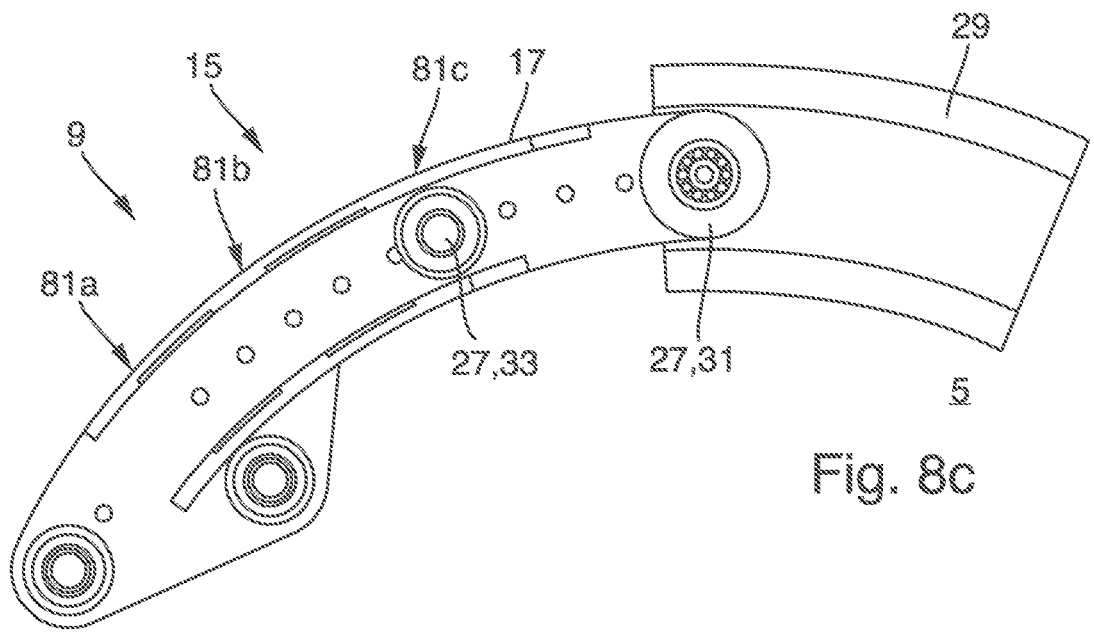

FIGS. 8a, 8b and 8c show an embodiment, where the distance between the upper flange portion 39 and the lower flange portion 41 of the slat track 17 is larger than a diameter of the second roller unit 33, such that a clearance 79 is provided either between the second roller unit 33 and the engagement surface 35 at the upper flange portion 39, or between the second roller unit 33 and the engagement surface 35 at the lower flange portion 41. The clearance 79 is smaller at gated locations 81a, 81b, 81c along the slat track 17 where the second roller unit 33 is located when the slat 7 is in the retracted position 11 (FIG. 8a), in a partly extended position 13 (FIG. 8b) and in a fully extended position 15 (FIG. 8c). The clearance 79 is larger in areas between the gated locations 81a, 81b, 81c.

Figure 9:
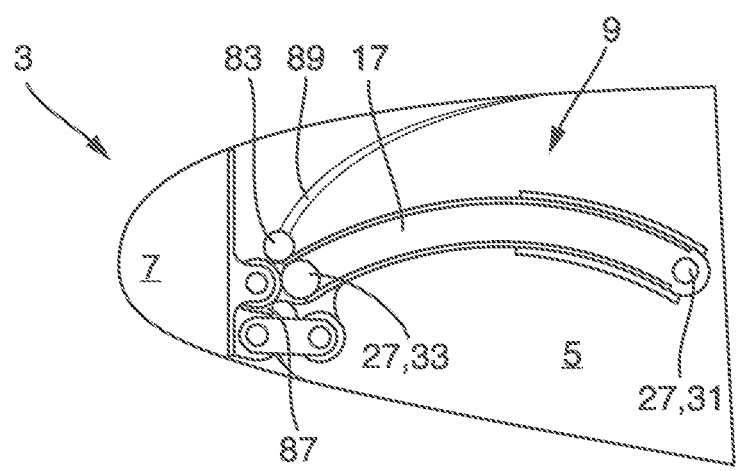
FIG. 9 is a cross sectional view of a wing according to another embodiment of the disclosure herein.

Another embodiment is shown in FIG. 9, where the roller bearing 27 comprises a third roller unit 83 mounted to the main wing 5 and engaging an upper surface 85 of the upper flange portion 39 of the slat track 17. The third roller unit 83 comprises one common roller element engaging both first and second track parts 59, 61. The third roller unit 83 is arranged proximate a leading edge 87 of the main wing 5 and partly outside the main wing 5 with respect to an outer skin profile line 89 of the main wing 5.

As shown in FIG. 1, the connection assembly 9 is a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91.

While at least one example embodiment of the invention (s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing;
a slat;

a connection assembly movable connecting the slat to the main wing, such that the slat is movable between a retracted position and at least one extended position, and wherein the connection assembly comprises an elongate slat track that extends along a track longitudinal axis between a front end and a rear end and has an intermediate portion between the front and rear ends, wherein the front end of the slat track is fixedly mounted to the slat, wherein the rear end and the intermediate portion of the slat track are movably mounted to the main wing by a roller bearing such that the slat track is movable along the track longitudinal axis, wherein the roller bearing comprises a guide rail fixedly mounted to the main wing and a first roller unit mounted to the rear end of the slat track and engaging the guide rail, and wherein the roller bearing comprises a second roller unit that is mounted to the main wing and that engages an engagement surface provided at the intermediate portion of the slat track, wherein the slat track has a profile comprising an upper flange portion, a lower flange portion and at least one web portion connecting upper and lower flange portions, and wherein the second roller unit is arranged in a recess between upper and lower flange portions and engages the engagement surface provided at the upper flange portion and/or at the lower flange portion.

2. The wing according to claim 1, wherein the slat track has such a profile that a first recess is formed between the upper and lower flange portions at a first side of the web portion, and a second recess is formed between the upper and lower flange portions at a second side of the web portion opposite the first side.

3. The wing according to claim 2, wherein the second roller unit comprises a first roller element and a second roller element,
wherein the first roller element is in the first recess and the second roller element is in the second recess, and
wherein first and second roller elements are arranged coaxially and have a same radius.

4. The wing according to claim 3, wherein the web portion of the slat track comprises a slot extending from the first side to the second side of the web portion and extending elongated along the track longitudinal axis,
wherein the first roller element and the second roller element are mounted on one common shaft for common rotation, and
wherein the common shaft proceeds through the slot from the first side to the second side of the web portion.

5. The wing according to claim 3, wherein the first roller element is mounted on a first shaft and the second roller element is mounted on a second shaft separate from the first shaft.

6. The wing according to claim 1, wherein the first roller unit comprises a single third roller element.

7. The wing according to claim 1, wherein the first roller unit comprises a third roller element and a fourth roller element,
wherein third and fourth roller elements are arranged coaxially and have a same radius.

8. The wing according to claim 1, wherein the slat track comprises a first track part and a second track part that are formed separate from one another,
wherein each of the first and second track parts is formed integrally and extends along the track longitudinal axis from the rear end to the front end, and
wherein the first and second track parts are mounted to one another and rest against one another along a contact plane spanned by the track longitudinal axis and a wing thickness direction.

9. The wing according to claim 8, wherein the first roller unit comprises a single third roller element mounted to both the first track part and the second track part.

10. The wing according to claim 8, wherein the first roller unit comprises a third roller element and a fourth roller element,
wherein third and fourth roller elements are arranged coaxially and have a same radius, and
wherein the third roller element is mounted to the first track part and the fourth roller element is mounted to the second track part.

11. The wing according to claim 1, wherein a distance between the upper flange portion and the lower flange portion of the slat track is larger than a diameter of the second roller unit, such that a clearance is provided either between the second roller unit and the engagement surface at the upper flange portion, or between the second roller unit and the engagement surface at the lower flange portion,
wherein the clearance is smaller at gated locations along the slat track where the second roller unit is located when the slat is in the retracted position and/or in a fully extended position and/or in a defined partly extended position, and
wherein the clearance is larger in areas between the gated locations.

12. The wing according to claim 1, wherein the roller bearing comprises a third roller unit mounted to the main wing and engaging an upper surface of the upper flange portion of the slat track.

13. The wing according to claim 1, wherein the connection assembly is a first connection assembly, wherein the wing comprises a second connection assembly connecting the slat to the main wing in a position spaced apart from the first connection assembly in a wing span direction, and wherein the second connection assembly is formed as the first connection assembly.

14. An aircraft comprising a wing according to claim 1.

15. A connection assembly for movably connecting a slat to a main wing for an aircraft, the connection assembly comprising:
an elongate slat track that extends along a track longitudinal axis between a front end and a rear end and has an intermediate portion between the front and rear ends,
wherein the front end of the slat track is configured to fixedly mount to the slat,
wherein the rear end and the intermediate portion of the slat track are configured to movably mount to the main wing by a roller bearing such that the slat track is movable along the track longitudinal axis,
wherein the roller bearing comprises a guide rail configured to fixedly mount to the main wing, and a first roller unit mounted to the rear end of the slat track and configured for engaging the guide rail, and
wherein the roller bearing comprises a second roller unit configured to mount to the main wing and configured for engaging an engagement surface provided at the intermediate portion of the slat track, wherein the slat track has a profile comprising an upper flange portion, a lower flange portion and at least one web portion connecting upper and lower flange portions, and wherein the second roller unit is configured to be in a recess between upper and lower flange portions and to engage the engagement surface provided at the upper flange portion and/or at the lower flange portion.

* * * * *